(12) United States Patent
Agrawal et al.

(10) Patent No.: US 10,067,979 B2
(45) Date of Patent: *Sep. 4, 2018

(54) ALLOCATION OF TENANTS TO DATABASE SERVICES

(71) Applicant: Microsoft Technology Licensing, LLC, Redmond, WA (US)

(72) Inventors: Sanjay Agrawal, Sammamish, WA (US); Guozhang Wang, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,202

(22) Filed: Mar. 7, 2017

(65) Prior Publication Data

US 2017/0193047 A1 Jul. 6, 2017

Related U.S. Application Data

(63) Continuation of application No. 12/982,899, filed on Dec. 31, 2010, now Pat. No. 9,613,092.

(51) Int. Cl.
*G06F 17/30* (2006.01)

(52) U.S. Cl.
CPC .. *G06F 17/30463* (2013.01); *G06F 17/30448* (2013.01); *G06F 17/30469* (2013.01); *G06F 17/30598* (2013.01); *H05K 999/99* (2013.01)

(58) Field of Classification Search
CPC ......... G06F 17/30448; G06F 17/30469; G06F 17/30598; G06F 17/30463
See application file for complete search history.

(56) References Cited

U.S. PATENT DOCUMENTS

| 2005/0021472 | A1* | 1/2005 | Gettman ........... G06F 17/30873 705/52 |
| 2006/0224563 | A1 | 10/2006 | Hanson et al. |
| 2006/0294066 | A1 | 12/2006 | Dettinger et al. |
| 2007/0255736 | A1* | 11/2007 | Chakrabarti ...... G06F 17/30705 |
| 2008/0005779 | A1* | 1/2008 | Takenaka ............ G06F 21/6218 726/1 |
| 2008/0281610 | A1 | 11/2008 | Yoshida et al. |
| 2009/0094193 | A1* | 4/2009 | King .................... G06F 21/6227 |
| 2009/0144746 | A1* | 6/2009 | Song ..................... G06F 9/4818 718/105 |

(Continued)

OTHER PUBLICATIONS

Chu, et al., "Least Expected Cost Query Optimization: What Can We Expect?", In the Proceedings of the Twenty-First ACM IGMOD-SIGACT-SIGART Symposium on Principles of Database Systems, Jun. 2002, 10 Pages.

(Continued)

*Primary Examiner* — Cam-Y Truong
(74) *Attorney, Agent, or Firm* — International IP Law Group, P.L.L.C.

(57) ABSTRACT

The claimed subject matter provides a system and method for automatic allocation of tenants to database services. An exemplary method comprises determining a query plan based on a workload for each tenant. A distance metric is created based on the query plan for each tenant, and tenants are clustered based on the distance metric into a predetermined number of clusters which is equal to the predetermined number of databases.

17 Claims, 4 Drawing Sheets

(56) References Cited

U.S. PATENT DOCUMENTS

| | | |
|---|---|---|
| 2010/0205216 A1 | 8/2010 | Durdik et al. |
| 2010/0223255 A1 | 9/2010 | Weissman et al. |
| 2010/0250608 A1 | 9/2010 | Malviya et al. |
| 2011/0295839 A1* | 12/2011 | Collins ............. G06F 17/30463 707/716 |
| 2012/0066020 A1* | 3/2012 | Moon ................ G06Q 10/0635 705/7.28 |
| 2012/0131683 A1 | 5/2012 | Nassar et al. |
| 2012/0173513 A1 | 7/2012 | Agrawal et al. |

OTHER PUBLICATIONS

Aulbach, et al., "Multi-tenant databases for software as a service: schema-mapping techniques", Retrieved at << http://citeseerx.ist.psu.edu/viewdoc/download?doi=10.1.1.142.2527&rep=rep1&type=pdf >>, SIGMOD/PODS, International Conference on Management of Data, Jun. 9-12, 2008, 12 Pages.

Chong, et al., "Multi-tenant data architecture", retrieved at <<http://msdn.microsoft.com/en-us/library/aa479086.aspx>>, Jun. 2006, 16 Pages.

Jacobs, et al., "Ruminations on multi-tenant databases", Retrieved at << http://subs.emis.de/LNI/Proceedings/Proceedings103/gi-proc-103-032.pdf >>, BTW Proceedings, vol. 103 of LNI, 2007, pp. 514-521.

Elmore, et al., "Who's driving this cloud? towards efficient migration for elastic and autonomic multitenant databases", Retrieved at << http://www.cs.ucsb.edu/research/tech_reports/reports/2010-05.pdf >>, UCSB Computer Science, Tecnical Report 2010-05, Apr. 2010, pp. 1-5.

Non-Final Office Action issued for U.S. Appl. No. 12/982,899, dated Dec. 20, 2012, 28 Pages.

Final Office Action issued for U.S. Appl. No. 12/982,899, dated Apr. 11, 2013, 29 Pages.

Non-Final Office Action issued for U.S. Appl. No. 12/982,899, dated Aug. 19, 2013, 40 Pages.

Final Office Action issued for U.S. Appl. No. 12/982,899, dated Apr. 11, 2014, 49 Pages.

Non-Final Office Action issued for U.S. Appl. No. 12/982,899, dated Aug. 28, 2014, 44 Pages.

Final Office Action issued for U.S. Appl. No. 12/982,899, dated Dec. 17, 2014, 50 Pages.

Non-Final Office Action issued for U.S. Appl. No. 12/982,899, dated Apr. 10, 2015, 59 Pages.

Final Office Action issued for U.S. Appl. No. 12/982,899, dated Jul. 8, 2015, 51 Pages.

Notice of Allowance issued for U.S. Appl. No. 12/982,899, dated Jun. 6, 2016, 14 pages.

Non-Final Office Action issued for U.S. Appl. No. 12/982,899, dated Aug. 25, 2016, 18 Pages.

Notice of Allowance issued for U.S. Appl. No. 12/982,899, dated Dec. 14, 2016, 10 pages.

* cited by examiner

200

300

ALLOCATION OF TENANTS TO DATABASE SERVICES

CROSS-REFERENCE TO RELATED APPLICATIONS

This application is a continuation of U.S. patent application Ser. No. 12/982,899, filed Dec. 31, 2010, and titled "Allocation of Tenants to Database Services", the application of which is incorporated herein in its entirety by reference.

BACKGROUND

Software that is available over the Internet with the ability to run behind a firewall on a local area network or personal computer may be known as Software as a Service (SaaS). The accessibility of SaaS continues to increase in a variety of areas, changing the mainstream model of computing. The SaaS approach has enabled recent advancements in cloud computing with the promise of low startup costs for infrastructure.

Technologies such as in-memory caching and web farms are in an excellent position to improve their service performance using SaaS, however, the use of traditional relational database management systems (RDBMS) as the backend data store still remains an integral part of such technologies. Typical database service providers may leverage traditional RDBMS multi-tenancy with shared schemas databases by collocating tenants into a number of databases which have the same schema. However, collocating tenants has a significant impact on the performance of the service. The collocation of tenants with extremely different data distributions or querying characteristics into the same database may lead to suboptimal performance of the underlying tenants.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for the automatic allocation of tenants to database services. An exemplary method comprises determining a query plan based on a workload for each tenant. A distance metric is created based on the query plan for each tenant, and tenants are clustered based on the distance metric into a predetermined number of clusters which is equal to the predetermined number of databases.

An exemplary system automatically allocates tenants to database services. One exemplary system comprises a processing unit and a system memory. The memory system, which comprises a computer-readable storage medium, stores code configured to direct the processing unit to sort tenants into a list according to a cost associated with each tenant. Also stored in the system memory is code to direct the processing unit to allocate tenants to a predetermined number of databases by partitioning the sorted list of tenants consecutively.

Another exemplary embodiment of the subject innovation provides one or more computer-readable storage media that includes code to direct the operation of a processing unit. The code may direct the processing unit to automatically allocate tenants to database services. The computer-readable storage media may comprise code that could direct a processing unit to determine a query plan based on a workload for each tenant. The computer-readable storage media may also comprise code to direct the processing unit to create a distance metric based on the query plan for each tenant. Code stored on the computer-readable storage media may also be configured to cause the processing unit to cluster tenants based on the distance metric into a predetermined number of clusters which is equal to the predetermined number of databases.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
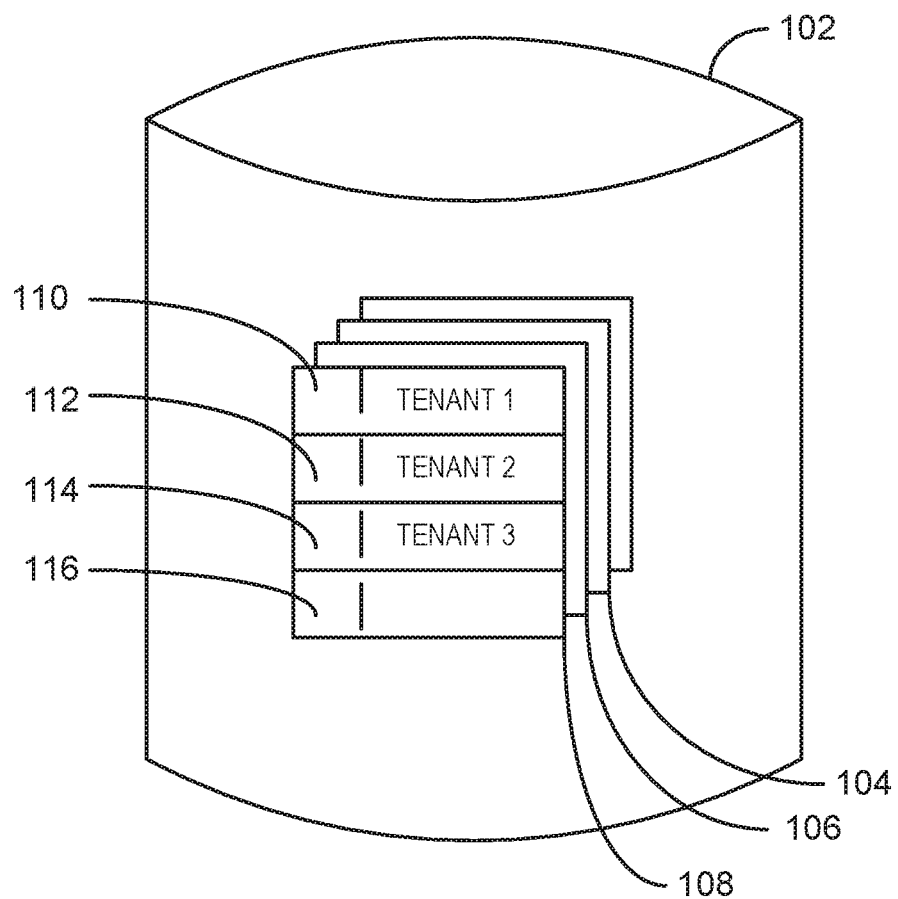
FIG. 1 is a diagram showing a system for a shared database with shared schema architecture in accordance with the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "tenant," "database," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

1 Introduction

The subject innovation relates to a method and a system for automatic allocation of tenants to database services. Database services may generally be defined as the storage and retrieval of data from a database host. Database service providers typically seek to reduce the cost of delivering database solutions to the user while offering increased control and personalization. Providing common services and software applications that can be deployed quickly for multiple users (called "tenants") of the common service may offer the desired control and personalization. This tenant structure has resulted in multi-tenant architectures appearing in a wide variety of business applications, including Customer Relationship Management (CRM), Supplier Relationship Management (SRM), Human Capital Management (HCM), Enterprise Content Management (ECM), Business Intelligence (BI) and Event Management systems.

Database service providers may introduce multi-tenancy in instances where the same service can be used for multiple tenants. For example, CRM service providers can use same database to host employees of different enterprises. Moreover, instead of deploying a set of services for each customer, a multi-tenant architecture can support multiple tenant applications with a single service development and installation process, thereby reducing the associated support and maintenance costs. In addition, a multi-tenant architecture requires a shorter provisioning time period for new tenants, as tenants can be added or modified without additional software installation and configuration.

In view of data isolation, architectural approaches to implement multi-tenant database services include separate databases, shared database with separate schemas, and shared database with shared schemas. In a separate database architecture, each tenant is allocated to a separate database on the server so that each tenant's data remains logically isolated from data belonging to other tenants. While the separate database architecture may provide the good data isolation for tenants, it usually entails relatively extensive hardware and maintenance requirements which result in high costs. Consequently, the separate database architecture may not scale well with thousands of tenants, needing significant hardware to support such service. The significant hardware necessary may be, for example, a large number of servers. This separate database approach may be a wiser choice for database services with a small number of large tenants.

In a shared database with separate schemas architecture, multiple tenants share the same host database, each tenant having its own tables using schema specifically created for the tenant. The scalability of the shared database with separate schemas approach is limited by the number of tables the database can handle. In addition, there may be a significant metadata overhead associated with a very large number of tables and structures.

In a shared database with shared schemas architecture, tenants share the same host databases, generic tables, and various schema-mapping techniques, which may be used to support primary functionalities and customizations to the database service. A tenant identifier column is associated with every table, and data access isolation may be achieved through a restricted querying interface provided by the database service. The querying interface checks a tenant's data access through the tenant identifier column before presenting any query results to the tenant. Since queries from different tenants hosted in the same database also share the same schema, the underlying RDBMS can reuse query plans very effectively in the shared database with shared schemas architecture. Query plans may be generally defined as an ordered set of steps used to access or modify information in the underlying RDBMS. Reusing query plans, as opposed to formulating new query plans, may dramatically reduce query compilation costs on the server. Additionally, this architecture may have improved resource sharing across tenants with less metadata overhead when compared to the separate databases architecture and the shared database with separate schemas architecture. As a result, shared database with shared schemas architecture may be easier to scale with very large number of tenants. Due to the effective resource utilization and lower maintenance cost, shared database with shared schemas architectures have been widely used by many SaaS providers for a large number of small tenants.

FIG. 1 is a diagram showing a system for a shared database with shared schema architecture in accordance with the subject innovation. System 100 is shown with one database for ease of explanation; although shown with one database, a small number of tenants, and a small number of shared schema, the subject innovation may use any number of databases, any number of tenants, and any number of shared schema.

The system 100 has a database 102. The database 102 may contain shared schema 104, 106, and 108. Shared schema 104 hosts tenants 110, 112, and 114. Tenants 110, 112, and 114 share the same host database 102 and also share generic tables and various schema-mapping techniques. A tenant identifier column 116 is associated with every table, and data access isolation is achieved through a restricted querying interface provided by the service. This querying interface checks a tenant's data access through the tenant identifier column 116 before presenting any query results to tenants 110, 112, and 114.

A possible consequence of the shared database with shared schema architecture is that the performance of database queries intended for a single tenant may be impacted by the presence of other tenants sharing the underlying database. While this statement holds true for multi-tenant services in general, its effect on the shared database with shared schema architecture may be much larger than other architectures. In the shared database with shared schemas architecture, the RDBMS may reuse query plans across different tenants. While reusing plans for queries is crucial to achieve efficient database service performance, this may cause the RDBMS to select query plans that may not be optimal for each tenant, and, consequently compromise query optimization for those tenants. Accordingly, it is crucial to properly decide which tenants will be assigned to a particular database so that certain tenants do not heavily compromise the query optimization of other tenants.

For an example of certain tenants heavily compromising the query optimization of other tenants, consider a Business Intelligence (BI) service used by various enterprises (tenants) to analyze sales data. In this scenario, the tenants are likely to have very different scales and distributions of such sales data. For instance, one enterprise may have data corresponding to hundreds of thousands of sales, while other enterprises may have a few hundred sales. Implementing a simple query plan that looks up the total sales of a product within a time period in a given region may be completely different according to the amount of sales. The optimal plan for tenants with a lower amount of sales could be a simple table scan, while the optimal plan for tenants with a higher amount of sales may be an RDBMS index lookup.

If tenants with lower sales figures are placed together with tenants who have higher sales figures in a shared database with shared schema architecture using a single plan for the sales query, it may lead to a significant degradation in database performance for some of the tenants. In this example, if the service provider could use two databases and move all tenants that use table scan into one database while others who use an RDBMS index lookup into are located in a second database, the result may be optimal performance for all tenants.

Finding the optimal database allocation strategy is decidedly more difficult with a large number of tenants allocated to a small number of databases. Because the querying interface supports many different kinds of query templates, finding the optimal strategy to allocate tenants such that the sub-optimality incurred by query plan reuse is minimized in all the different query templates is significantly hard. Query templates are generally a set of queries that are supported by the querying interface of the server. They may be instantiated as a set of parameterized queries, prepared queries, or stored procedures. The problem of finding an optimal allocation of a given set of tenants to a small number of databases is referred to as the Tenant Allocation Problem.

The Tenant Allocation Problem may occur is various scenarios. First, the Tenant Allocation Problem may occur when database service providers migrate from a dedicated database architecture to a shared database with shared schema architecture as database usage increases significantly. For instance, a database service in startup mode may initially offer database service with a dedicated database architecture with relative ease because the initial number of tenants may be few and manageable. However, as the service becomes more mature and the number of tenants increases significantly, the database service provider may want to move to a shared database with shared schema architecture in order to reduce the increasing overhead costs.

Second, the Tenant Allocation Problem may occur when tenants are re-allocated between databases in an existing shared database with shared schema architecture. Tenants may change their data scale, data distribution, and query workload characteristics as they grow or adjust their applications. As a result, the current allocation of tenants may no longer be optimal and the database service provider may observe that the performance of the query processing decreases. The degradation of query processing may necessitate moving tenants between databases or add a new database to the existing server and reallocate tenants to improve overall service performance.

2 Tenant Allocation Problem 2.1 Input and Output

Without any specific assumptions about the RDBMS optimizer's behavior, computational complexity theory would classify the problem of obtaining an optimal solution to the Tenant Allocation Problem as non-deterministic polynomial-time hard (NP-Hard). In other words, it may be very difficult to achieve an optimal solution for the Tenant Allocation Problem.

The input to a technique to solve the Tenant Allocation Problem consists of a multi-tenant server S and a set of customer tenants T. S provides a set of database systems D sharing the same schema as the backend hosts and a set of "query templates" Q for all the tenants using the service. The query templates correspond to the restricted querying interface discussed herein. All data access, including modifications and customizations of the service, can be done using the query templates. Typically, the number of databases used to host the database service is orders of magnitude smaller than the number of tenants.

Tenants may have different data scales and data distributions, and also a different set of predicted or predefined "instances" of such query templates, based on the workload characteristics of each particular tenant. The set of instances $I_{ij}$ of tenant i for a particular query template j represents the query j's workload of tenant i. The query workload distribution can be represented by a set of instances, with some instances appearing more than once, indicating the frequency. The query workload distribution may also be represented by a set of distinct query instances, each with its appearing frequency. For data access isolation, each query template has a tenant identifier as an input parameter which will be checked by the querying interface. The query template may have additional parameters that allow tenants to access or modify their own data.

The output to a technique to solve the Tenant Allocation Problem is a set of groups (or clusters) of tenants. Each group is assigned to a separate database where the database stores the tenant's data and serves the corresponding queries issued by the tenants. Additionally, tenants may be replicated into multiple databases for availability and performance.

2.2 Optimizer Interface

Given a query template, most commercial database systems select a single query plan which is used or reused by all instances of the query template. Query plan reuse is widely applied in both on-premise and off-premise applications, such as cloud based services. High throughput facilitates cloud based services. Moreover, high throughput reduces the recompile time for queries, which can otherwise lead to significant performance overhead on the underlying system. For example, stored procedures where each procedure corresponds to a query template are typically compiled a single time. After a single compilation, the query plans are subsequently reused for future, possibly different, instances of the stored procedure. Reuse may also occur in prepared or parameterized queries where the RDBMS optimizer may reuse an existing query plan from the query plan cache for the incoming instances of such queries. As a result, selecting specific query plans for a query template given a set of instances may be desirable when tenants are collocated to different backend hosts. When tenants are allocated to different backend hosts, their data and predicted query workloads are also sent to their specific database systems. With different data distributions and query workloads, different plans may be generated by the database systems for a given query template. If throughput for the template is low, database performance suffers.

Commercial RDBMS provide query interfaces to recommend optimal plan for a single query instance. Interfaces that recommend an optimal plan for a single query instance typically return the optimizer estimated cost of such a plan for the provided query instance. Currently, there is limited support for interfaces that recommend an optimal plan for multiple query instances in commercial RDBMS. The interface may pick a plan for the template that optimizes the cost of the set of query instances. However, the techniques used to optimize the cost of the set of query instances are not generally available in commercial RDBMS due to lack of efficiency. Instead, most commercial RDBMS use very simple mechanisms to select a query plan for a given query template to apply to its query instances. These commercial RDBMS optimizers may generate a plan based on first used parameters or may use some form of parameter sniffing to come up with the underlying plan. In an attempt to avoid bad plans, the commercial RDBMS optimizers provide users with the ability to determine an optimized plan for their scenario. Commercial RDBMS optimizers also provide interfaces to determine the optimizer estimated cost of a particular query plan using query instance and an input plan.

For ease of description, the techniques are presented assuming a black box RDBMS optimizer model. No assumptions are made regarding the strategy used by the database system to pick the plan for the given query template. The optimizer simply selects a plan. In other words, assume the RDBMS optimizer provides the following API: Given a set of instances of a single query template, the RDBMS API returns a plan of maximum effectiveness in addition to the estimated total cost of using the plan for executing the input set of query instances. This is referred to as a Query Template Cost (QTC) API. The QTC API may be implemented by using existing interfaces that are available in a number of commercially available database systems. In addition to the specific plan recommendation for a given set of query instances of a query template, the API returns the total optimizer estimated cost of executing the plan for all input instances as the metric to quantify the query processing performance for such a plan.

Formally, the Tenant Allocation Problem is NP-hard if no assumption is made regarding the RDBMS optimizer interface. Suppose there are have n tenants T: $(t_1, t_2, \ldots, t_n)$ to be allocated to k databases D: $(d_1, d_2, \ldots, d_k)$, and the databases support m query templates Q: $(q_1, q_2, \ldots, q_m)$, with each tenant having its own query workload for each query template as a set of instances $(\{t_i^{j1}\}, \ldots, \{t_i^{jm}\})$, where $\{t_i^{jk}\}$ is tenant j's instance set of query template j. A given database uses the single query plan execution for all instances of a query template, given its tenants' data distribution and query workload. The process of the single plan generation and cost estimation by the optimizer is modeled as a black-box function $f: (t^s, q) \rightarrow R^{30}$, which takes $t^s$ as a group of tenants allocated to that database and output the estimated total cost of executing their query instances of query template q using its generated plans. Assume the following property about $f$:

$$\forall t^{s1}, t^{s2}, q: f(t^{s1}, q) + f(t^{s2}, q) \leq f(t^{s1} \cup t^{s2}, q)$$

This assumption states that it is inherently "not worse" to separate a set of tenants into two databases rather than cluster them into one database process using any query template. The goal of the Tenant Allocation Problem is to allocate n tenants to k databases as $\{d_{i:} t^{si}\}$ so that the total cost $\Sigma_{i=1}^{k} \Sigma_{j=1}^{m} f(t^{si}, q_j)$ is minimized.

With no additional constraints on the optimizer function $f$, the Tenant Allocation Problem can be reduced to the Graph Coloring Problem. The Graph Coloring Problem is well known in the art of computational complexity theory and is recognized to be NP-hard. The reduction of the Tenant Allocation Problem to the Graph Coloring Problem is as follows: each tenant represents a vertex, and each database represents a color. The function $f$'s output space is $\{0, \inf\}$, and there is an arbitrary set of pairs of tenants, such that if the subset $t^s$ contains any pair of tenants, $f(t^s, q) = \inf$, otherwise $f(t^s, q) = 0$ for any q. The behavior of function $f$ still satisfies the assumption about $f$. For each pair of tenants, there is an edge between their vertices, which results in a graph. If there exists a k graph coloring solution in polynomial time such that no edge has two endpoints with the same color in the solution, then there is an optimized allocation strategy which has a total cost of 0 in polynomial time also. Since the Tenant Allocation Problem can be successfully reduced to the Graph Coloring Problem, which is known to be NP-hard, the Tenant Allocation Problem is also NP-hard.

The NP-hard complexity of the Tenant Allocation Problem suggests that it will be very difficult to find a solution to that can achieve both performance efficiency and optimality at the same time. Because of this difficulty, two solutions that can achieve varying degrees of performance efficiency and optimality may be desirable.

3 Solutions to the Tenant Allocation Problem

Despite the inherent hardness of the problem, the following observations allow for efficient approaches in real world practice. First, current RDBMS optimizers typically generate a small set of distinct query plans for a query template as the candidate search space. Second, database APIs that suggest optimized plans for a query and estimate the costs are generally efficient. This is a core component of query processing and has been fine-tuned to generate good plans in an efficient manner. In light of these observations, the Tenant Allocation Problem has optimized solutions that, at minimum, take at least an order of magnitude shorter time than the exhaustive algorithm, which searches through the entire allocation space for an optimized solution.

According to the subject innovation, tenants may be clustered such that the overall performance of the database service is maximized. First, the database service may use a fixed number of databases, typically a relatively small number. The specific number may be chosen based on performance criteria for a particular database service. Second, the database service may have a large number of tenants. Third, each tenant may bring on a query distribution, possibly different for each tenant. The queries are instances of query templates as provided by the service. Fourth, the underlying data distribution for tenants is typically expected to be different. Fifth, for a given database, tenants collocated on that particular database may use the same plan for a particular query instance corresponding to the plan selected for the query template by the underlying database. Each plan for a given query instance has a certain performance measured as an estimated cost for the plan. Causes of sub-optimality related to plan selection as induced by the selection of specific tenants on the database are further explored.

Figure 2:
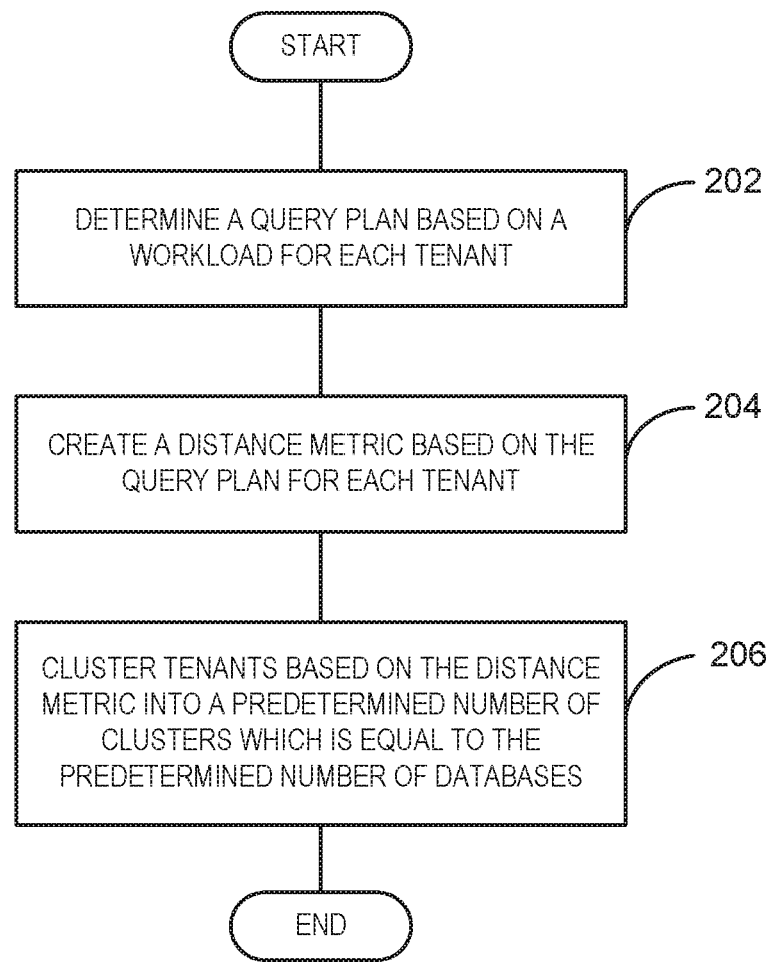
FIG. 2 is a process flow diagram of a method for automatically allocating tenants to database services in accordance with the subject innovation.

FIG. 2 is a process flow diagram of a method for automatically allocating tenants to database services in accordance with the subject innovation. The method 200 offers a solution to the Tenant Allocation problem. At block 202, query plan based on a workload for each tenant is determined. A distance metric is created based on the query plan for each tenant at block 204. At block 206, tenants are clustered based on the distance metric into a predetermined number of clusters which is equal to the predetermined number of databases. Alternatively, tenants may be clustered based on a cost metric.

3.1 Greedy Approach

The first approximation is based on the assumption that the sub-optimality of allocating two tenants into a single database with reused query plans will not be greatly affected by the workload of other tenants collocated on the same database. As a result, tenants may be allocated iteratively by making the group collocation choice that induces minimum sub-optimality at the moment.

This approach is called the Greedy Approach (Greedy), and is implemented through an agglomerative hierarchical clustering technique. A high level view or pseudo-code of an algorithm that may be used to implement the Greedy Approach is presented below:

---
Algorithm 1: Greedy Hierarchical Clustering Algorithm
---
1. $G = \emptyset$
2. for i = 1 to n do
3.     Initalize group $g_i = \{t_i\}$; $G = G \cup \{g_i\}$;
4. end
5. while G. size > k do
6.     Compute
    $\text{argmin}_{1 \leq i,j \leq G.size}$ Distance($g_i, g_j$);
7.     $G = (G - \{g_i\} - \{g_j\}) \cup \{g_i \cup g_j\}$;
8. end
9. Output G;
---

At the beginning of the Greedy Approach, each of the n tenants form a single cluster of tenants. At each step, a pair of clusters with a minimum distance is merged into one cluster until there are k remaining clusters. Each cluster of tenants is then allocated into a database. The distance metric is defined as the following:

$$\text{Distance}(t^{s1}, t^{s2}) = \sum_{j=1}^{m} [f(t^{s1} \cup t^{s2}, q_j) - f(t^{s1}, q_j) - f(t^{s1}, q_j)] \geq 0$$

This distance metric may be defined as the increased total estimated query processing time of executing the two workloads using one database instead of executing the two workloads in two different databases. The Greedy Approach may also be implemented incrementally. When a new tenant is added to the service, the tenant may be allocated to one of the databases such that increase in total cost of the overall service is minimized. When a new database instance is added, divisive clustering is implemented by choosing a cluster to split into two clusters. The clusters are split so that the total cost of the service is maximally reduced.

As mentioned herein, the QTC API returns an optimized plan with its corresponding total estimate cost for an input set of instances for a given query template. Therefore, with m query templates, computing the distance of two groups of tenants will make O(m) API calls. In any iteration, at least two tenants are collocated so that no more than O(n) iterations are needed. Computing the distance between every pair of tenant clusters at every iteration of the algorithm will incur $O(n^3 m)$ total QTC API calls, noting that n is substantially larger than k. Although this is cubic to the number of tenants, many of the API calls are the same in terms of the parameter set of instances due to the hierarchical structure of the Greedy Approach. Thus, in any one iteration, O(n) new tenant combinations (and no more) are evaluated as against $O(n^2)$. Caching resulted in optimized plans with their estimate costs enables a reduction in the number of QTC API calls to $O(n^2 m)$, and also significantly improves the running time.

3.2 The Dynamic Programming Approach

For the second approach, assume that for a specific template, if two tenants have similar costs in their distributions of the parameter space, their optimized plans may also be similar. Thus, when the tenants are collocated in the same database, the generated plan will be close to optimal for the two tenants. This approach is called the Dynamic Programming Approach (Dynamic). A high level view or pseudo-code of an algorithm that may be used to implement the Dynamic Programming Approach is presented below:

---
Algorithm 2: Dynamic Programming Partitioning Algorithm
---
1. Sort $(t_1,...,t_n)$ as a list ST - $(t_{1'},...,t_{n'})$ according to $f(t_i)$;
2. $G = \emptyset$
3. dp(n, k, ST, G):
4. Output G;
---
Procedure dp(n, k, ST, G)
---
1. if n = k then
2.     for i = 1 to k do
3.         $g_i = \{t_{i'}\}$, $G = G = \cup \{g_i\}$;
4.         Return $\Sigma_{i=1}^{k} f(t_{i'})$
5.     end
6. end
7. if k = 1 then
8.     $g = \{t_{1'},...,t_{n'}\}$, $G = G = \cup \{g_i\}$;
9.     Return f $t_1, \cup ... \cup t_{n'}$;
10. end
11. Copy G to G';
12. Compute
    $\text{argmin}_{k-1 \leq p \leq n-1} \Sigma_{j=1}^{m} f(t_{p'} \cup ... t_{n'})$ + dp (p, k - 1, ST, G');
13. Return $\Sigma_{j=1}^{m} f(t_{p'} \cup ... t_{n'})$ + dp (p, k - 1, ST, G);
---

This assumption made in the Dynamic Programming Approach is quite reasonable. For instance, analyze the least specific cost (LSC) plan generation method. The LSC plan generation method approximates the query template parameter distributions by using the mean or modal value and then chooses an optimized plan for that parameter value and is well known in the art. This method follows the assumption made in the Dynamic Programming Approach. Further, when the cost of a plan is approximately linear in the parameter space of interest, many other well known plan generation methods, such as least expected cost (LEC), will produce LSC plans.

In the Dynamic Programming Approach, tenants are sorted based on their total costs, such as costs for all instances of the various query templates. The sorted list is partitioned consecutively to generate the allocation strategy following a recursive manner. If the optimizer does apply the LSC plan generation strategy, the following sub-structure holds for a single query template:

$$OPT(n,k) = \min_i(OPT(n-i, k-1) + f(t'_{n-i+1} \cup ... \cup t'_n))$$

where OPT(n, k) means the optimized strategy's total cost for allocating n sorted tenants to k databases, and $t'_i$ is the $i^{th}$ tenant on the sorted list.

For a single query template $q_j$, the LSC equation actually strengthens the property of the optimizer function to maintain concavity:

$$\forall t^{s1}, t^{s2}: f(t^{s1}, q_j) + f(t^{s2}, q_j) \leq f(t^{s1} \cup t^{s2}, q_j) = (|\{i_{s_i}^j\}| + |\{i_{s_j}^j\}|) \times f(\text{mean}(t^{s1}, t^{s2}, q_j), q_j)$$

where mean($t^{si}$, $t^{si}$, $q_j$) returns a single instance taking the mean parameter value of all query instances of tenants in $t^{s1}$ and $t^{s2}$ regarding $q_j$. As a result, the optimized solution will occur by having consecutive tenants in the sorted list according to their total cost. This approach results in a total of $O((n-k)^2 m)$ optimizer API calls, which is quadratic to the number of tenants.

Cases can be constructed with multiple templates that result in solutions worse than optimal for the Dynamic Programming Approach. However, experimental data shows that this approach results in good solutions for the Tenant Allocation Problem with for multiple templates. This may be a result of the fact that in real-world applications, the estimated query costs for query instances of different query templates are not distributed randomly, but are strongly correlated with the underlying query templates. For example, different query instances for a complex reporting query corresponding to a single query template across different tenants are likely to have higher cost distributions compared to another query template that does a lookup on a small table, even for different tenants.

By selecting different tenant allocations for a database, the plan that gets selected for the query template for a given database can be varied for the tenants that are collocated on that particular database. The goal is to allocate tenants so that over all the service performance is maximized. This is measured as the total estimated cost of all query instances for all tenants for the service and is to be minimized.

5 Comparison of Approaches

Both the Greedy Approach and the Dynamic Programming Approach scale well with the task size (i.e. the number of tenants and databases) as well as workload size (i.e. number of query instances). Both approaches may be implemented on top of a commercially available RDBMS, using the optimizer as a black box, or on any off-the-shelf database systems. Optimizer estimated cost may be used as a metric to quantify the overall service performance of a given tenant allocation. The use of optimizer estimated costs has been well established in various performance tuning tools, such as physical design tuning and plan selection. As such, the use of optimizer estimated costs is well known in the art.

The overall performance of a tenant allocation approach is highly dependent on the number of QTC API calls. Any solution desirably calls the QTC API as little as possible. As such, it seems that the Dynamic Approach may be a wiser choice because it results in much fewer QTC API calls when compared to the Greedy Approach. However, with small query workloads, the Greedy Approach can effectively reuse previously computed plans and estimated costs because it explores not more than a few new combinations of tenants due to its hierarchical structure and caching of RDBMS SQL calls. Hence, with fewer query templates, the Greedy Approach may outperform the Dynamic Programming Approach. However, as the workload complexity increases, the Greedy Approach may not effectively save its RDBMS SQL calls through caching, and the Dynamic Approach will gradually provide better performance. The implementation of the underlying QTC API layer, which calls the RDBMS SQL interfaces, strongly affects the observed performance of the allocation approaches. If an RDBMS supports an efficient QTC API equivalent interface, it may be better to use the Dynamic Approach for better performance. Consequently, in addition to the run time of the two approaches, number and efficiency of QTC API calls is a factor for the two approaches.

Figure 3:
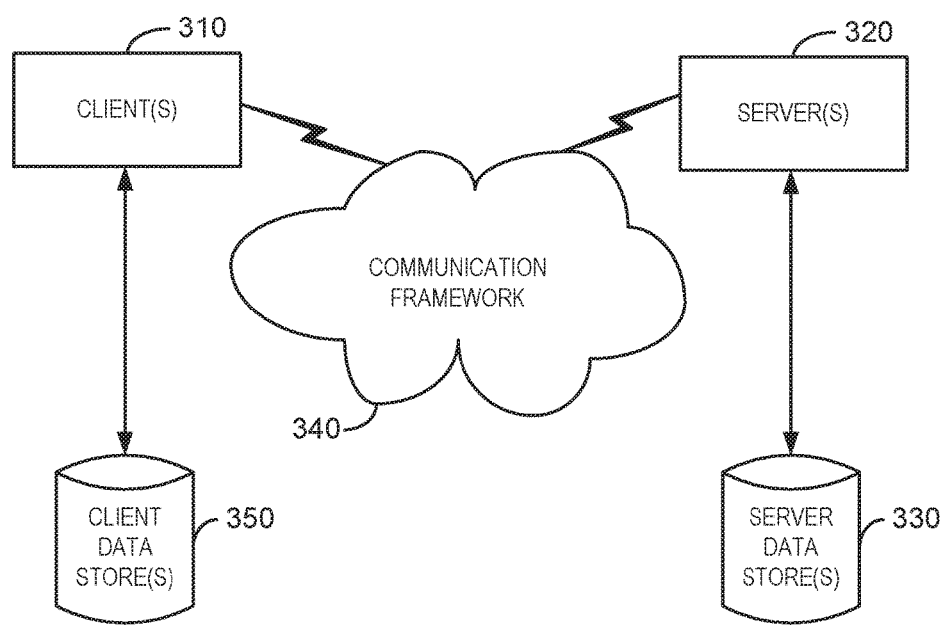
FIG. 3 is a block diagram of an exemplary networking environment wherein aspects of the claimed subject matter can be employed.
Figure 4:
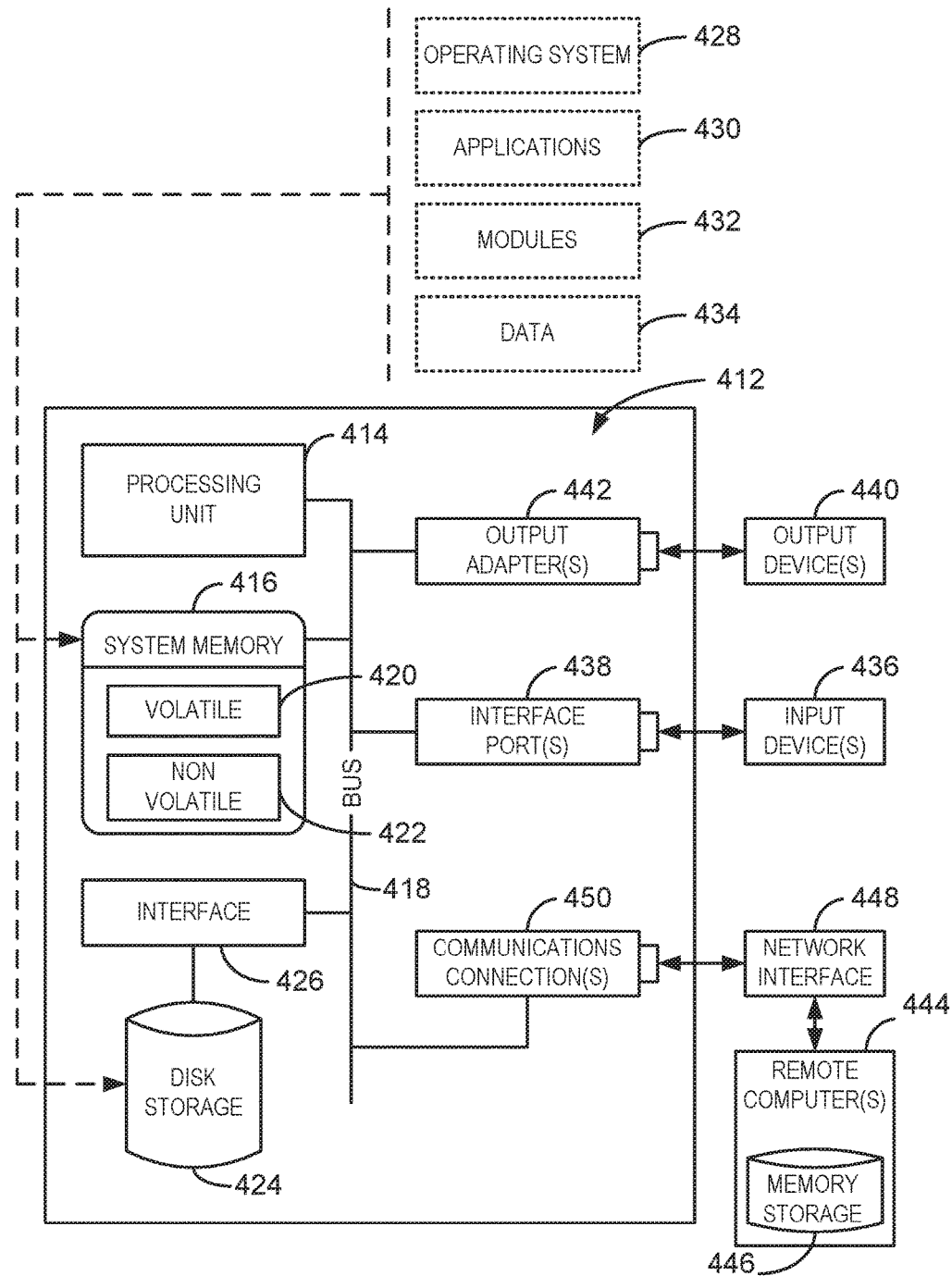
FIG. 4 is a block diagram of an exemplary operating environment that can be employed in accordance with the subject innovation.

In order to provide additional context for implementing various aspects of the claimed subject matter, FIGS. 3-4 and the following discussion are intended to provide a brief, general description of a suitable computing environment in which the various aspects of the subject innovation may be implemented. For example, solutions to the Tenant Allocation Problem, as described herein, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 3 is a schematic block diagram of a sample-computing system 300 with which the claimed subject matter can interact. The system 300 includes one or more client(s) 310. The client(s) 310 can be hardware and/or software (e.g., threads, processes, computing devices). The system 300 also includes one or more server(s) 320. The server(s) 320 can be hardware and/or software (e.g., threads, processes, computing devices). The server(s) 320 may host the database services as discussed herein.

One possible communication between a client 310 and a server 320 can be in the form of tenant identifiers adapted to be transmitted between two or more computer processes. The system 300 includes a communication framework 340 that can be employed to facilitate communications between the client(s) 310 and the server(s) 320. The client(s) 310 are operably connected to one or more client data store(s) 350 that can be employed to store information local to the client(s) 310. The client data store(s) 350 do not have to be in the client(s) 310, but may be located remotely, such as in a cloud server. Similarly, the server(s) 320 are operably connected to one or more server data store(s) 330 that can be employed to store information local to the servers 320.

As an example, the client(s) 310 may be computers providing access to software services over a communication framework 340, such as the Internet. The server(s) 320 may be able to monitor software services accessed by the client.

With reference to FIG. 4, an exemplary environment 400 for implementing various aspects of the claimed subject matter includes a computer 412. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures known to those of ordinary skill in the art.

The system memory 416 may comprise non-transitory computer-readable storage media that includes volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 412 also includes other non-transitory computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that the claimed subject matter can be implemented with various operating systems or combinations of operating systems.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440. Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting databases containing multiple tenants in a networked environment using logical connections to one or more remote computers, such as remote computer(s) 444. The remote computer(s) 444 may be client systems configured with web browsers, PC applications, mobile phone applications, and the like, to allow users to access the database services, as discussed herein. The remote computer(s) 444 can be a personal computer, a server, a router, a network PC, a workstation, a microprocessor based appliance, a mobile phone, a peer device or other common network node and the like, and typically includes many or all of the elements described relative to the computer 412. For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary embodiment of the computer 412 may comprise a server hosting databases containing multiple tenants. An exemplary processing unit 414 for the server may be a computing cluster comprising Intel® Xeon CPUs. The disk storage 424 may comprise an enterprise data storage system, for example, holding thousands of user pages. Exemplary embodiments of the subject innovation may provide database services using shared databases with shared schema as described herein.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

The invention claimed is:

1. A computer system for automatic allocation of tenants to one or more databases, the system comprising: a processor; and a system memory, wherein the system memory comprises code configured to direct the processor to:

determine, by the computer system, a query plan for each query template of each tenant of the tenants, wherein said each query template comprises a tenant identifier and a set of queries associated with a restricted querying interface of a database service specific to a server among a plurality of servers to potentially house the one or more databases via a network, wherein the set of queries has restricted data access to a database that includes shared tables of data based on a tenant identifier column of a table, and wherein the set of queries enables each tenant to access the database that includes shared tables of data from the table shared between the tenants;

verify each tenant's data access based on the restricted querying interface using the tenant identifier;

create a distance metric based on the query plan for said each tenant of the tenants, wherein the query plan is reused for said each tenant in the shared table with a shared schema, and wherein the query plan comprises an ordered set of instructions to access or modify the database that includes shared tables of data from the shared table;

cluster the tenants based on the distance metric into a predetermined number of databases; and allocate a new tenant to the database by using the generated plan such that an increase in a total cost of the database service is minimized.

2. The system of claim 1, wherein the processor is to merge a pair of tenants with a minimum distance metric into one cluster until there is a predetermined number of clusters remaining.

3. The system of claim 1, wherein the processor is to:

form two new clusters of tenants by splitting one cluster of tenants from a previous database such that a total cost of service is maximally reduced;

collocate a first new cluster to the previous database; and collocate a second new cluster to a new database.

4. The system of claim 1, wherein the processor is to select the one or more databases according to a total cost associated with said each tenant.

5. The system of claim 1, wherein the distance metric is defined as an increased total estimated query processing time of executing two workloads using one database instead of executing said workloads in two different databases.

6. The system of claim 1, wherein the clustering comprises greedy agglomerative hierarchical clustering.

7. The system of claim 1, wherein the query plan comprises a table scan or an index lookup in the table within the database wherein each tenant of the tenants are located.

8. A computer-implemented method for automatic allocation of tenants to one or more databases, the method comprising:

determining, by a computer system, a query plan for each query template of each tenant of the tenants, wherein said each query template comprises a tenant identifier and a set of queries associated with a restricted querying interface of a database service specific to a server among a plurality of servers to potentially house the one or more databases via a network, wherein the set of queries has restricted data access to a database that includes shared tables of data based on a tenant identifier column of a table, and wherein the set of queries enables said each tenant to access the database that includes shared tables of data from the table shared between the tenants;

verifying, by a computer system, each tenant's data access based on the restricted querying interface using the tenant identifier;

creating, by a computer system, a distance metric based on the query plan for said each tenant of the tenants, wherein the query plan is reused for said each tenant in the shared table with a shared schema, and wherein the query plan comprises an ordered set of instructions to access or modify the database that includes shared tables of data from the shared table;

clustering, by a computer system, the tenants based on the distance metric into a predetermined number of databases; and allocating, by a computer system, a new tenant to the database by using the generated plan such that an increase in a total cost of the database service is minimized.

9. The computer-implemented method of claim 8, wherein a pair of tenants with a minimum distance metric is merged into one cluster until there is a predetermined number of clusters remaining.

10. The computer-implemented method of claim 8, comprising:

forming two new clusters of tenants by splitting one cluster of tenants from a previous database such that a total cost of service is maximally reduced;

collocating a first new cluster to the previous database; and collocating a second new cluster to a new database.

11. The computer-implemented method of claim 8 comprising selecting the one or more databases according to a total cost associated with said each tenant.

12. The computer-implemented method of claim 8, wherein the distance metric is defined as an increased total estimated query processing time of executing two workloads using one database instead of executing said workloads in two different databases.

13. The computer-implemented method of claim 8, wherein the clustering comprises greedy agglomerative hierarchical clustering.

14. The computer-implemented method of claim 8, wherein the query plan comprises a table scan or an index lookup in the table within the database wherein each tenant of the tenants are located.

15. One or more non-transitory computer-readable storage media, comprising code configured to direct a processor to:

determine a query plan for each query template of each tenant of tenants, wherein said each query template comprises a tenant identifier and a set of queries associated with a restricted querying interface of a database service specific to a server among a plurality of servers to potentially house one or more databases via a network, wherein the set of queries has restricted data access to a database that includes shared tables of data based on a tenant identifier column of a table, and wherein the set of queries enables each tenant to access the database that includes shared tables of data from the table shared between the tenants;

verify each tenant's data access based on the restricted querying interface using the tenant identifier;

create a distance metric based on the query plan for said each tenant of the tenants, wherein the query plan is reused for said each tenant in the shared table with a shared schema, and wherein the query plan comprises an ordered set of instructions to access or modify the database that includes shared tables of data from the shared table;

cluster the tenants based on the distance metric into a predetermined number of databases; and allocate a new tenant to the database by using the generated plan such that an increase in a total cost of the database service is minimized.

16. The one or more non-transitory computer-readable storage media of claim 15, wherein the code is configured to direct the processor to merge a pair of tenants with a minimum distance metric into one cluster until there is a predetermined number of clusters remaining.

17. The one or more non-transitory computer-readable storage media of claim 15, wherein the code is configured to direct the processor to:

form two new clusters of tenants by splitting one cluster of tenants from a previous database such that a total cost of service is maximally reduced;

collocate a first new cluster to the previous database; and collocate a second new cluster to a new database.

* * * * *